Dec. 27, 1966  F. H. PRESTWOOD  3,295,130
TESTING APPARATUS FOR TARGET AIRCRAFT MICROWAVE EQUIPMENT
Filed May 21, 1965  3 Sheets-Sheet 1

INVENTOR
FRANKLIN H. PRESTWOOD

Harry A. Herbert Jr.
ATTORNEY
BY
Eugene J. Paulikowski
AGENT

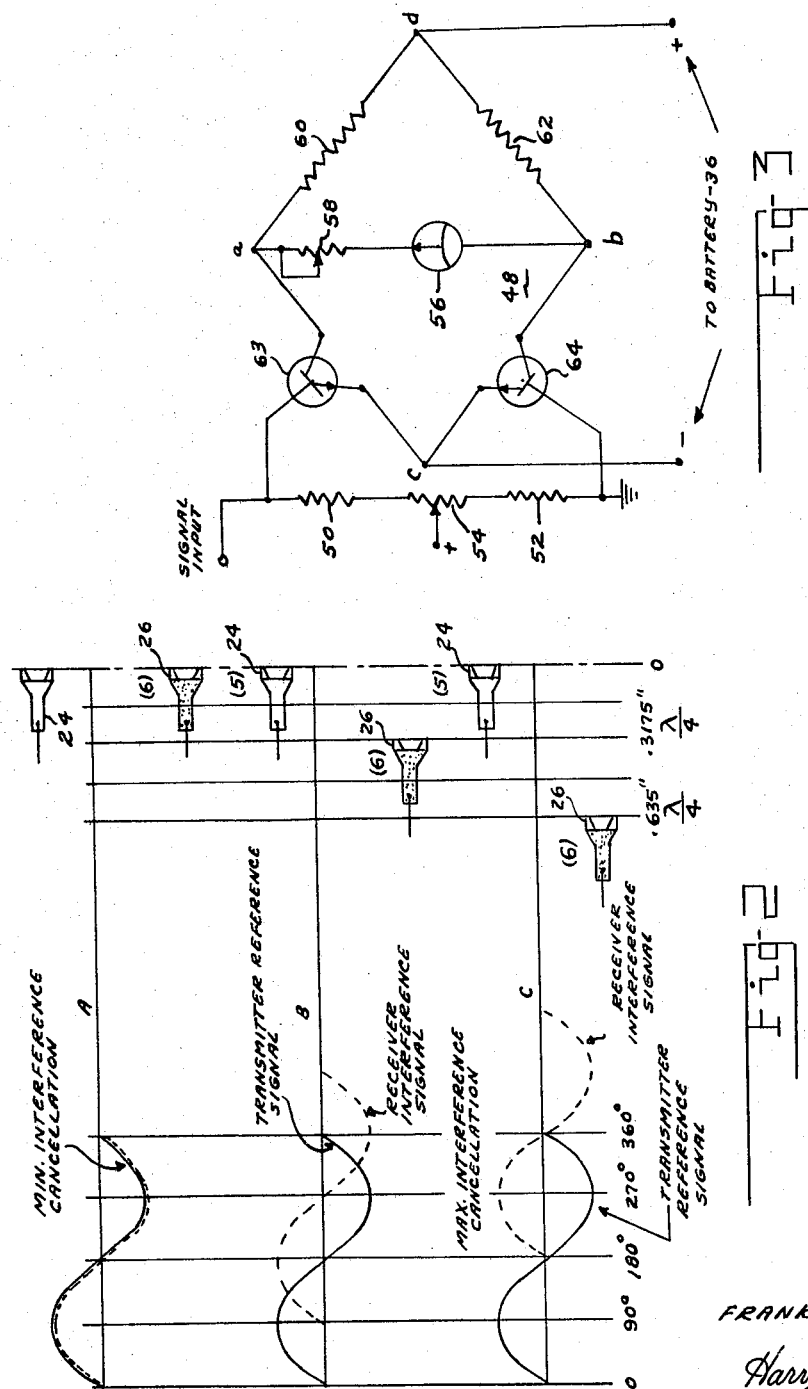

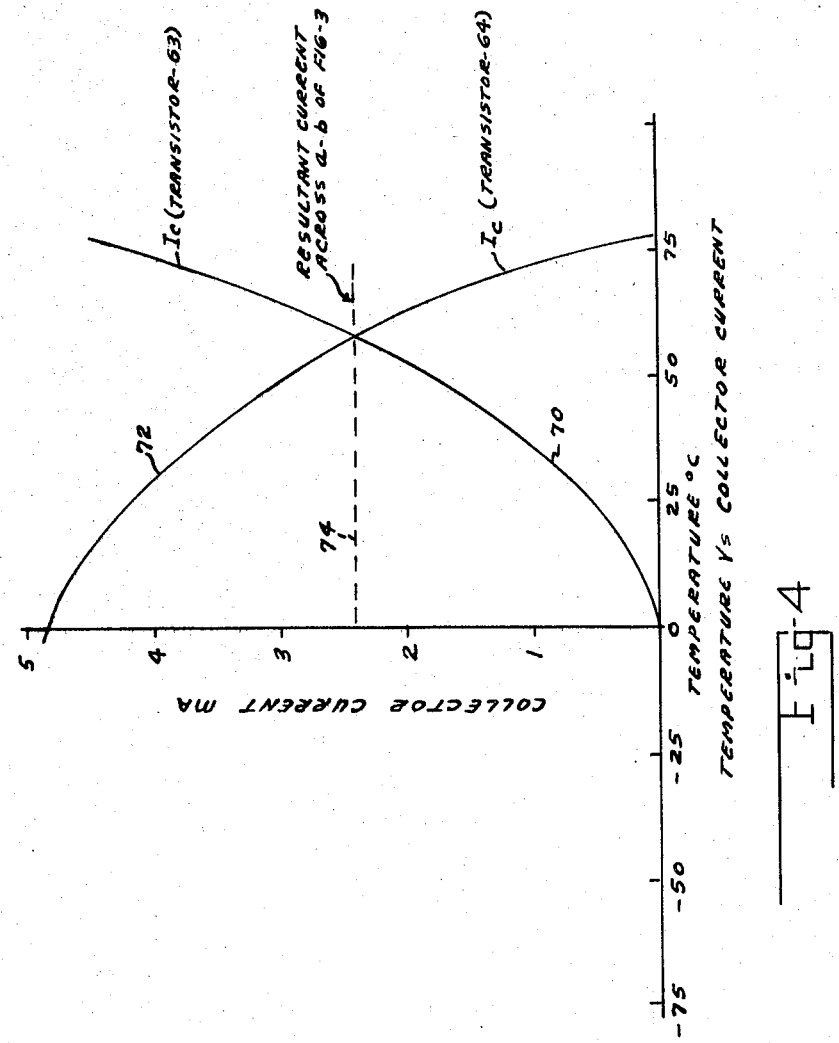

United States Patent Office 3,295,130
Patented Dec. 27, 1966

3,295,130
TESTING APPARATUS FOR TARGET AIRCRAFT MICROWAVE EQUIPMENT
Franklin H. Prestwood, Valparaiso, Fla., assignor to the United States of America as represented by the Secretary of the Air Force
Filed May 21, 1965, Ser. No. 457,878
6 Claims. (Cl. 343—17.7)

The invention described herein may be manufactured and used by or for the United States Government for governmental purposes without the payment to me of any royalty thereon.

This invention relates to portable testing apparatus of the type which finds special utility in ascertaining whether radar, communication, or microwave equipment is operationally fit and, particularly, to a portable tester useful in the preflight testing of electronic equipment used on aerial targets such as rocket-propelled missiles, drones, tow targets and the like.

In certain military training operations designed to test the adequacy of radar defense systems, it has long been the practice to direct aerial vehicles acting as targets into a predetermined geographical area and allow the ground search radar system protecting that area to detect the approach of the targets early enough for interceptors to meet their approach and take defensive action. In comparison with fixed wing aircraft, such as bombers, which are generous in size and not nearly so expendable, vehicles used as targets generally have a small echo area so that the quantity of the signal returned to the tracking system is quite small at long ranges. Positive detection therefore usually comes only after approach of the target within the inner boundaries of the air defense screen. This leaves little time to carry out air-to-air intercept procedures and, consequently, the training period is not effectively utilized. To curb this, it is the practice to install aboard each target a radar control amplifier, commonly termed an "augmenter," which is interrogated and arranged to return an amplified signal to the ground station. From the point of view of the search radar system the target acts in effect like an electronic reflector whose apparent size is greater than the size of the target itself. In terms of signal strength displayed on the PPI scope or other indicating means placed at the disposal of ground personnel, the target, despite its actual physical dimensions, appears as a "threat target" and its approach is detected soon enough to alert defensive aircraft. While now the interceptors can be vectored in time to meet the "hostile" airborne object, visual contact is not always possible. Therefore, once radar contact is made by the fire control system of the interceptor, the target is interrogated and the response to the interrogation is used to establish a course for a firing pass. In the case of aerial targets being towed into the search area, at supersonic speeds in one known instance, the mother aircraft runs the risk of being taken for the target in which case it conceivably could come under attack. Absolute readiness of the augmenter to perform properly in flight operations therefore must be established in order to avoid confusion possibily endangering the mother aircraft.

In a typical ground test of the flight readiness of the augmenter, radar signal energy is focused on the target and interrogates the augmenter. A signal returned to the test equipment indicates acceptable performance of the device undergoing test. In one known arrangement, a traveling-wave tube is used as the augmenter, so that the target equipment is assumed to be reliably operating when the receiver in the tester is actuated by the traveling-wave tube. It is important to perform such operational tests in the maintenance area where the target is parked, such as on the flight line, since this obviates removal of the augmenter system from the target. Prior known testing devices have the disadvantage of being bulky, some on the order of 200 pounds, and thus are difficult to transport to and from the flight line. By way of explanation, a mobile power supply of the gasoline-engine variety is required by previous testing equipment to furnish the necessary power. A further disadvantage of prior art devices of the type contemplated is to require connection to components within the target vehicle. As an example, one of the prior art methods involves signal injection directly to the augmenter, i.e., with no connection to the input antenna of the target. In bypassing the antenna leading to the augmenter, a signal emitted from the target could falsely indicate flight readiness when actually the augmenter is oscillating due perhaps to a gaseous condition or an imperfection in the traveling-wave tube. Another method presently used for augmenter preflight testing is to cover the input and output antennas of the target with cup-type test horns which effectively remove the antennas from the performance test. Ambiguous results from this technique are possible since there is some uncertainty as to whether the augmenter is operating as an amplifier or merely oscillating. Other disadvantages of present preflight equipment for certifying target-carried augmenters operational are weight, complexity of test equipment, and the requirement of trained personnel to operate the test equipment. The importance can readily be seen of permitting performance testing to be done by unskilled operators, or at least by those not totally familiar with the procedure or having had no extensive training in handling the equipment involved.

Accordingly, an object of the invention is to provide a broadband analyzer for testing the flight readiness of electronic components incorporated in aerial target vehicles useful in aircraft detection exercises.

Another object of the invention is the provision of a preflight testing device which is small, light-weight, suitable for hand carrying, and capable of battery operation.

A further object of the invention is to provide a preflight testing device capable of being operated rapidly by untrained personnel, merely after reading brief operating instructions printed on the case.

Still another object of the invention is the provision of a portable test set which is eminently suited for use at extremely short ranges from the antennas of target system undergoing test.

Yet another object of the invention is to provide a portable tester of the character described which incorporates transmitting and receiving elements in the same housing and which can be used for preflighting traveling-wave tube augmenters in their flight line environment.

A further object of the invention is the provision of a test device which is compact, light, inexpensive to manufacture, and capable of long periods of flight line and field use.

A tester constructed in accordance with the invention comprises a microwave transmitter and receiver mounted in the same case and powered by a self-contained battery supply. Microwave energy is directed toward the target being tested and the amplified microwave signal returned by the augmenter enters the receiving section and after further amplification is fed to a bridge circuit which gives an indication of acceptable performance by becoming unbalanced. Each time the transmitter operates, a portion of the transmitted signal is fed directly to a phase detector which is coupled to the receiving section. In practice, interference signals coming from the transmitter enter the receiver because of the confinement of the transmitter and receiver elements in the same package. These interference signals, commonly called "spillover," are channeled over multiple paths and make it difficult to prevent interaction between the transmitter and receiver circuits. The present invention realizes appreciable isolation by making the receiving antenna of the tester movable with respect to the transmitting antenna. A space-phase displacement of the leading edges of the transmitter and receiver antenna of one-half the wavelength of the transmitter frequency produces 180° phase cancellation of the reference signal and spillover interference signals to the extent that only the signal energy forwarded via the augmenter has an effect on the indicator circuit. Simultaneous transmission and reception thus proceeds with negligible mutual interference and the recovery time between the transmitter and receiver units is effectively reduced to zero. Additional isolation is provided by means of a baffle mounted midway between the transmitter and receiver antennas of the tester to interrupt surface waves using the case as a conducting medium. Lightweight components are used throughout making the tester extremely easy to handle. An additional feature in the indicating circuit includes the use of matched temperature-compensating transistors which nullify the effect of collector current variation with ambient temperature changes.

Other objects and characteristic features of the invention will become apparent as the specification proceeds.

In the accompanying drawings:

FIG. 2 illustrates the space-phase displacement feature of the invention embodiment of FIG. 1;

FIG. 3 is a schematic of the temperature-compensating indicator circuit of the invention; and FIG. 4 is a plot of temperature versus collector current for the transistors of the indicator circuit.

Figure 1:
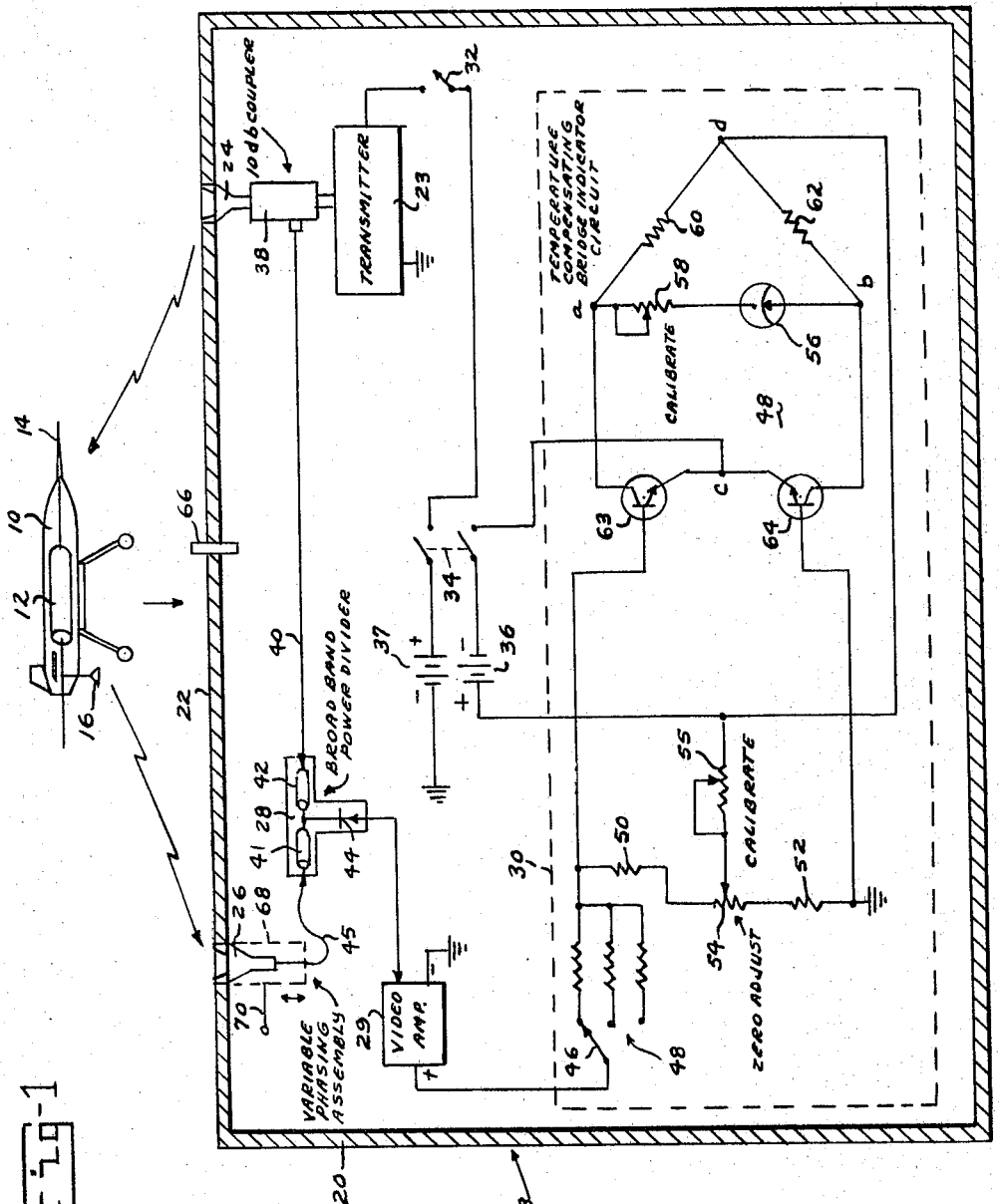
FIG. 1 is a schematic drawing of the invention which shows the tester circuit and connections.

Referring now to FIG. 1, an aerial target 10 has been depicted, this target carrying an augmenter 12 of suitable type shown connected between an input antenna 14 and an output antenna 16 and forming a part of an interrogate-transmit system by which the presence of the target in a predetermined geographical area may easily be detected, as previously described. One well-known type of augmenter presently in use is the conventional traveling-wave tube but the target may, of course, include any suitable amplifier circuit capable on external interrogation of producing an amplified signal coupled to antenna 16.

The test device according to the invention is designated generally by the reference character 18 and is shown enclosed in a housing or case 20 having a front panel 22 the plane of which is normal to the plane of the paper as seen in FIG. 1. The principal elements of tester 18 include transmitter 23, a pair of spaced horn radiators 24 and 26 mounted on parallel axes and acting as transmitter and receiver antennas, respectively, broad-band power divider 28, video amplifier 29, indicating circuit generally referenced 30, interrogating switch 32 and power switch 34, and two sources of unidirectional current herein shown as batteries 36 and 37 which may be either the disposable dry-cell type or rechargeable wet cells. In use with the invention, batteries 36 and 37 supply approximately nine and twenty-eight volts, respectively.

Associated with radiator 24 is a coupling element 38 for transferring a fraction of the transmitted energy to power divider 28 over conductor 40. As will be discussed below, the energy coupled to power divider 28 will serve as a reference signal for carrying out phase comparison giving desirable reduction of internal spillover signals. Associated with power divider 28 are balanced coaxial arms 41 and 42 terminating in a T-connection coupled to the cathode of a crystal detector 44 having its anode coupled to video amplifier 29. Coaxial arm 41 is tied to receiving antenna 26 by a flexible conductor 45; arm 42 is connected to conductor 40.

From the description thus far, it will be appreciated that power divider 28 is constructed in a well-known manner to effectively suppress two signals simultaneously applied to arms 41 and 42 which have the same frequency and amplitude but which differ in phase from each other by 180°. Where the amplitudes of the two signals may differ as well, a difference signal is the result.

The output of video amplifier 29 is fed to the moveable arm 46 of a range selector switch 48 and thence is channelled in one direction to a bridge circuit generally indicated 48, and in another direction to a resistance network comprising fixed resistors 50 and 52 and variable zero adjust resistor 54. One end of resistor 52 is connected to ground. A calibrate resistor 55 is coupled between the moveable arm of resistor 54 and the positive terminal of battery 36.

While bridge circuit 48 as shown herein is in the form of a conventional Wheatstone bridge, it differs from the conventional circuit in several important respects which will be covered below in greater detail. Considering for the moment the elements of bridge circuit 48, there is shown a sensitive galvanometer null detector 56 in series with a calibrate resistor 58 between two diagonally opposite corners $a$ and $b$. The other two diagonally opposite corners $c$ and $d$ are connected to the negative (−) and positive (+) terminals of battery 36, respectively. Constant resistors 60 and 62 are connected in two adjacent sides of the bridge circuit. Connected in the other two adjacent sides are identical NPN transistor amplifiers 63 and 64, the base of the former being fed with the output signal of video amplifier 29 and the base of the latter being tied to ground. As will hereinafter be seen when the operation of the tester embodying the invention is described, with the bridge circuit once balanced unbalancing it is an indication of the degree of fitness of the target-carried augmenter for flight operations in a training environment.

To give some idea concerning the size of the tester embodying the invention, horns 24 and 26 are separated by approximately eight inches from center-to-center. As seen in FIG. 1, the leading edges of the horns are flush mounted to panel 22 of housing 20 and, in the preferred embodiment, 28° coverage for each in azimuth and 28° coverage for each in elevation has produced favorable results.

Two related problems associated with the testers of the character described involve difficulties in achieving dependable internal and external isolation. As defined herein, improving internal isolation involves coping mainly with interference signals, commonly called spillover or RF interaction, between the receiving and transmitting components caused inherently by their confinement in a small package. Where poor external isolation is found, this is ordinarily attributed to coupling paths formed between the transmitting and receiving antennas by external objects such as the target, the target-support cradle, and the ground. Of the two, internal isolation as a rule is the most difficult to improve. Although complete isolation is not an absolute requirement, it is desirable for reasons of stability, and for minimizing confusion when used by unskilled operators. Spillover can often produce a meter reading regardless of antenna orientation and with no output from the target undergoing test. Thus, in the case of an augmenter being inoperative, an unskilled operator seeing a deflection of the null indicator could be led to conclude that the augmenter is fit for service when, quite unsuspectingly it is not.

With this information in mind, a fixed baffle 66 of essentially rectangular cross section and of electrically conducting material, such as aluminum because of lightness, is attached to panel 22 of housing 20 at a point substantially midway between the centers of antennas 24 and 26. From the previous description, it follows that the distance from each antenna to baffle 66 is roughly four inches. Looking at FIG. 1, it is noted that panel 22 bisects baffle 66 with the result that both ends of the baffle extend beyond both sides of panel 22. From front to back baffle 66 has a length of 2λ where λ is the wavelength of the frequency of transmitter 23. At a transmitter frequency of 9275 mc., λ may be calculated as follows:

$$\lambda(\text{in.}) = \frac{984 \times 12(\text{in.})}{9275(\text{mc.})} \simeq 1.27 \text{ in.}$$

Thus, in the example taken baffle 66 has a dimension of about 2.54 in. measured from front to back. Further, if viewed from the front in a direction of the arrow shown in FIG. 1, baffle 66 preferably runs vertically from top to bottom of tester 18 and thus will have a length sufficient to extend above and below the spread of antennas 24 and 26. By means of baffle 66, antenna 26 is effectively shielded from those waves of transmitter energy having external transmission paths along panel 22. This is because the waves propagating along panel 22 in the direction of antenna 26 must undergo a directional change of 90° in the vicinity of baffle 66 which causes the waves to be attenuated.

Another feature of the invention designed to increase internal isolation rests in the construction of mounting receiver antenna 26 on a movable platform 68 arranged for axially moving antenna 26 with respect to transmitter antenna 24. Although illustrated herein schematically to achieve simplicity in the drawings, it will be understood that platform 68 has a reversible motion and thus can be run in and out with antenna 26 thereon moving concurrently therewith. Various suitable mechanisms giving any degree of precision desired for regulating the travel of platform 68 readily suggest themselves to those skilled in the art and hence are shown schematically in FIG. 1 simply by a lever 70 understood to be attached to platform 68. As shown in FIG. 1, antenna 26 is at the forward limit of the travel of platform 68 but is adjustable backward a distance of one wavelength or so. By the described arrangement, a variable phasing assembly is provided for the purpose of canceling interference waves (spillover) between the two antennas in a manner which is best explained with reference to FIG. 2.

Looking now at FIG. 2, it will be noted that the reference characters identifying the transmitter and receiver antennas have been carried over unchanged from FIG. 1. Also, front panel 22 of housing 20 defines a zero reference point from which displacement of antenna 26 will be measured as platform 68 is adjusted. A wavelength scale graduated in increments of λ/4 indicates the position of antenna 26 relative to antenna 24. Referring to the curves shown on the three horizontal time axes A, B and C, the continuous sinusoidal waveform represents the reference signal fed to coaxial arm 42 over conductor 40; each broken sinusoidal waveform represents the summation of all spillover interference signals admitted to antenna 26 during transmission. Time correspondence between the various sets of waveforms is maintained and the vertical axis is taken as the amplitude axis. The diagrammatic examples of phase comparison taken up in FIGURE 2 for consideration are quite explanatory in themselves so that what follows concerning the variable phasing assembly of the invention will be quite brief. For simplicity, the amplitudes of the signals applied to coaxial arms 41 and 42 of power divider 28 will be assumed to be essentially equal.

With no space-phase displacement of the leading edges of antennas 24 and 26, which is the first case illustrated, the phase difference between the reference signal conducted to coaxial arm 42 and the interference signal admitted to coaxial arm 41 through antenna 26 is at a minimum so that cancellation of the two signals is correspondingly low. The reference signal is in effect superimposed on the interference signal and it passes to crystal detector 44. By the criteria established hereinabove, isolation is poor.

In the second case illustrated when antenna 26 is moved rearward by λ/4, or roughly 0.3175 inch, the reference signal and interference components reaching antenna 26 are approximately 90° out of phase. Should these amplitudes be equal, the resultant interference signal is attenuated to the extent that approximately three-fourth of its value in the first example remains. When now antenna 26 is moved λ/2, or about 0.635 inch from the leading edge of antenna 24, the signals admitted to power divider 28 are 180° out of phase and the resultant signal fed to crystal detector 44 is essentially zero, or but a small fraction, of the resultant obtaining with essentially 0° phase difference. Isolation, of course, is materially improved.

Because of the direct connection afforded by conductor 40 the amplitude of the reference signal is ordinarily greater than the amplitude of the interference signal. However, by adjusting antenna 26 in the manner just described, cancellation effects have been observed producing isolation between the transmitter and receiver sections on the order of 80 db. Adjustment of the antenna 26 can be set permanently at the factory or be left to the operator in the field.

Referring now to FIG. 3, which is a simplified schematic of the modified Wheatstone bridge circuit 48 shown in FIG. 1, transistor amplifiers 63 and 64 perform multiple functions as bridge elements, amplifiers, and temperature sensing and compensating devices. The bridge is balanced by adjustment of resistor 54 thereby controlling the quiescent base-to-emitter voltage of transistor 63. With the bridge balanced, points $a$ and $b$ are at substantially the same potential and therefore null indicator 56 is centered. It is well known that transistors are susceptible to ambient temperature thereby producing corresponding values in the amount of their collector current. Temperature drift of this type can affect the position of null indicator 56. As a specific advantage of the invention, bridge circuit 48 will tend to remain balanced after the initial zero adjustment despite shifts in ambient temperature. This is accomplished by identically matching the electrical characteristics of transistors 63 and 64 so that, being in opposite current paths, they offset changes of their internal resistance caused by variations in ambient temperature. Curves 70 and 72 in FIG. 4 represent the relationship of the collector current against ambient temperature changes for transistors 63 and 64, respectively. The resultant curve bears the reference numeral 74. It will be observed from an inspection of FIG. 4 that bridge circuit 48 of the invention embodiment is made relatively independent of ambient temperature changes.

In a practical working embodiment testing the illustrated invention, satisfactory results were obtained with the tester held from five to forty feet from the target undergoing test. In the description which follows outlining the operation of the invention, the performance levels mentioned are merely illustrative of a successfully constructed device and should not be construed in any way as to limit the invention to the power levels prescribed.

Transmitter 23 is preferably a solid state device such, for example, as Model 909 of Hughes Aircraft Company. The transmitted energy is crystal controlled at 9275 mc. with approximately 1.2 mw. C.W. power output. Powered by battery 37, transmitter 23 draws roughly 100 ma. during a brief transmitter on time on the order of 1 to 5 seconds. Transmitter power is approximately 1.1 mw. when switch 32 is closed. The transmitter signal is impedance matched through coupler 38 and thence from antenna 24 is radiated in the direction of target 10. Roughly 10 db, or 1/10 of the transmitter signal, is fed through coupler 38 to arm 42 of power divider 28 where it acts in a manner previously described to produce cancellation of spillover signals reaching antenna 26 via interacting multiple path links. The output signal radiated to target 10 is approximately 1 mw., plus a gain of around 15 db introduced by antenna 24.

Let it be assumed that augmenter 12 of target 10 is a traveling-wave tube energized in preparation for the test. Accordingly, the signal incident on antenna 14 is amplified by augmenter 12 and forwarded to antenna 16 at the frequency of transmitter 23. At antenna 26 of tester 18 the incoming signal is fed through arm 41 of power divider 28 and crystal detector 44 to amplifier 29. Amplification takes place in video amplifier 29 and again in transistor 63 which upsets the balanced condition of bridge circuit 48. Such an indication is positively registered and the null deflection occurs always to one side of center with displacement being conveniently controlled by operating range selector switch 48 or by changing the distance of the tester relative to the target.

The tester 18 embodying the invention is also capable of simultaneously checking the operability of the radar safety arming signal emitted by augmenter 12. By way of explanation, the fire control apparatus of intercepting aircraft must be armed before the pilot can expend his ordnance against the target. Therefore, the microwave signal emitted by the augmenter usually carries a low frequency recognition signature which, when received by the fire control system, sets the system to permit a firing pass. For example, a typical arming signature (useful only to the intercept aircraft) is 10 c.p.s. By referring particularly to the bridge circuit 48, it will be noted that no damping components, such as capacitors, are associated with null indicator 56. Therefore, with tester 18 trained on target 10, and with null indicator 56 actuated by the signal produced by augmenter 12 of the target being tested, the needle, now off center, can readily be seen dancing, or flickering, at the rate of 10 c.p.s. It is the manifestation of these two signals when displayed by null indicator 56 that permits swift visual evidence of the operability of the augmenter being checked and the functioning of the apparatus impressing the radar arming signal on the augmenter output.

While modifications and changes may be made in the constructional details and features of this invention, it will be apparent that such changes could be made without departing from the spirit of the invention or the scope of the appended claims.

I claim:

1. In an aerial target system which includes a target-mounted amplifier intermediate receiver-transmit means, apparatus for testing the operational fitness of said amplifier, said apparatus comprising:
   a transmitter operable at the frequency of the output signal of said amplifier;
   energy transfer means for drawing power from said transmitter to form a reference signal of the same period as the transmitted signal;
   a pair of forwardly-directed horn elements laterally spaced from one another to define an output antenna fed by said transmitter and an input antenna principally responsive to radiation from said target but simultaneously receiving spillover wave energy originating in said transmitter;
   phase-comparison means having a first input terminal coupled to said input antenna, a second input terminal coupled to receive said reference signal, and an output terminal;
   said phase comparison means deriving a signal substantially free of said spillover wave energy when said spillover wave energy and said reference signal are relatively phase displaced on the order of 180°;
   reversible drive means for causing axial movement of said input antenna relative to said output antenna in a sense to introduce said 180° relative phase displacement;
   and indicating means responsive to the signal at the output terminal of said phase-comparison means to form a signal indicating when said amplifier is operating in a radiating condition subsequent to the moment a test signal is transmitted to said target.

2. In an aerial target system which includes microwave receive-transmit means aboard the target including an amplifier, apparatus for performing preflight tests as to the operational fitness of said equipment, said apparatus comprising:
   a transmitter operable at a frequency the same as the frequency of the output signal of said amplifier;
   coupling means for drawing a preselected amount of power from said transmitter to form a reference signal of the same period as transmitted wave energy;
   a pair of forwardly-directed antenna elements laterally spaced from one another in an array defining an output antenna fed by said transmitter and an input antenna principally receptive to radiation from said target but undesirably receiving spillover wave energy originating in said transmitter;
   phase comparison means having a first input terminal coupled to said input antenna, a second input terminal receiving said reference signal from said coupling means, and an output terminal;
   said phase comparison means deriving a signal in which said spillover wave energy is substantially fully attenuated when said spillover wave energy and said reference signal are relatively phase displaced on the order of 180°;
   reversible drive means for causing axial movement of said input antenna relative to said output antenna in a sense to introduce said 180° relative phase displacement;
   amplifier means coupled to said output terminal of said phase comparison means;
   and indicating means fed by said amplifier means for generating a signal indicating when said amplifier is operating in a radiating condition subsequent to the moment a test signal is transmitted to said target.

3. In aerial target systems which include microwave equipment having a traveling-wave tube amplifier, apparatus for preflight testing the operational fitness of said equipment comprising:
   a housing including a front panel having a flat surface;
   a transmitter in said housing operable at the output frequency of said traveling-wave tube amplifier;
   a pair of horn elements laterally spaced from each other on parallel axes and forwardly projecting through said panel to define an output antenna fed by said transmitter and an input antenna primarily receptive to radiation from said target but simultaneously receiving during transmission spillover wave energy originating in said transmitter;
   reversible drive means movably supporting said input antenna and positioned to produce space phase displacement of said input and output antennas by a distance equal to approximately one-half the wavelength of said transmitter frequency;
   phase comparison means having a first input terminal coupled to said input antenna, and further having a second input terminal and an output terminal;
   energy-transfer means for applying a fraction of the transmission energy to said second input terminal of said phase comparison means;
   said phase comparison means at said output terminal thereof deriving an output signal in which spillover wave energy linking said transmitter to said input antenna is substantially completely attenuated;
   amplifier means coupled to said output terminal of said phase comparison means;
   and indicating means controlled by said amplifier means for generating a signal indicative of when said traveling-wave tube amplifier is operating in a radiating condition subsequent to the moment when a test signal is transmitted to said target.

4. An aerial target system in accordance with claim 3 wherein said indicating means comprises a Wheatstone bridge.

5. In aerial target systems which include microwave equipment having a traveling-wave tube amplifier, apparatus for preflight testing the operational fitness of said equipment, said apparatus comprising:

a housing including a front panel having a flat surface;

a transmitter in said housing operable at a wavelength $\lambda$ the same as the operating wavelength of said traveling-wave tube amplifier;

a pair of horn elements laterally spaced from one another on parallel axes and forwardly projecting through said panel to define an output antenna fed by said transmitter and an input antenna receptive to radiation from said amplifier but simultaneously receiving during transmission spillover wave energy originating in said transmitter;

a microwave-energy baffle bisecting said panel at a point substantially midway between the axes of said horn radiators;

said baffle having a dimension parallel to said axes of approximately $2\lambda$ and being adapted to extend slightly beyond the inner and outer surfaces of said panel so as to cause wave-energy attenuation;

reversible drive means movably supporting said input antenna and positioned to produce space phase displacement of said input and output antennas by a distance equal to approximately one-half $\lambda$;

phase comparison means having a first input terminal coupled to said input antenna; and further having a second input terminal and an output terminal;

energy-transfer means for conducting a predetermined fraction of the transmission energy from said transmitter to said second input terminal of said phase comparison means;

means in said phase comparison means whereby an output signal is derived at said output terminal thereof in which spillover wave energy linking said transmitter to said input antenna is substantially completely attenuated;

amplifier means coupled to said output terminal of said phase comparison means;

and indicating means controlled by said amplifier means for generating a signal indicative of when said traveling-wave tube amplifier is operating in a radiating condition subsequent to the moment when a test signal is transmitted to said target.

6. In an aerial target system in accordance with claim 5 wherein said indicating means comprises a Wheatstone bridge including in opposing current branches transistor amplifiers having essentially identical temperature-response characteristics to provide collector-current compensation in response to ambient temperature drift.

References Cited by the Examiner

UNITED STATES PATENTS

| | | | |
|---|---|---|---|
| 2,050,418 | 8/1936 | Boerner | 343—12 |
| 2,540,076 | 2/1951 | Dicke | 343—12 |
| 3,199,103 | 8/1965 | Augustine | 343—12 |
| 3,243,812 | 3/1966 | Williams | 343—12 |

CHESTER L. JUSTUS, *Primary Examiner.*

T. H. TUBBESING, *Assistant Examiner.*